Nov. 4, 1941.  S. N. SMITH  2,261,303

EGG GRADING MACHINE

Filed Aug. 18, 1939  2 Sheets-Sheet 1

INVENTOR.
BY Stanley N. Smith
Gardner W. Pearson
ATTORNEY.

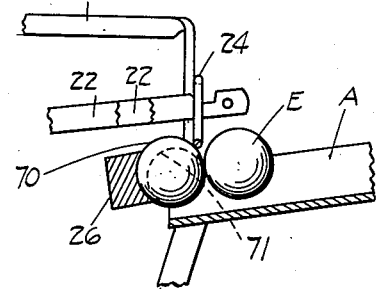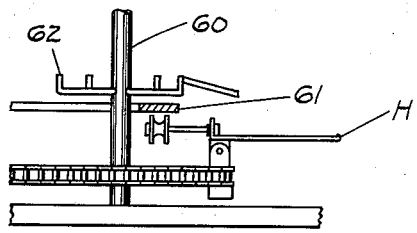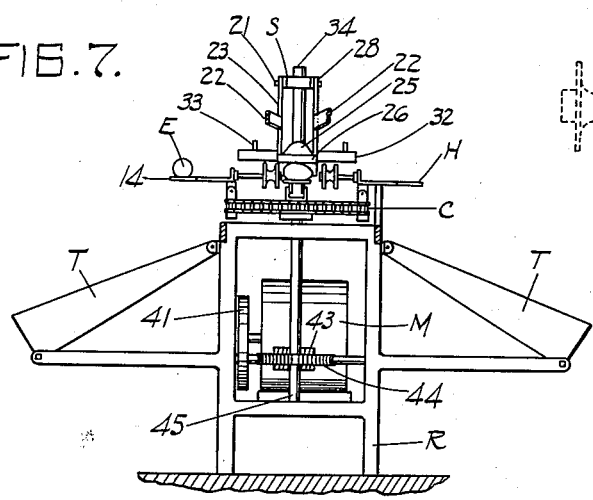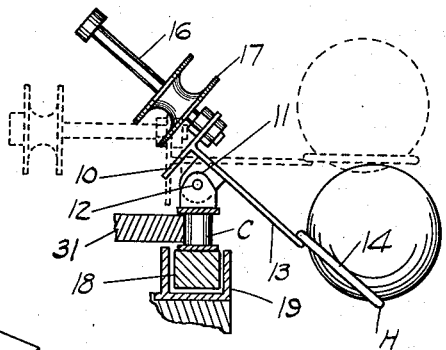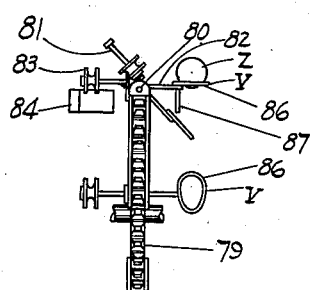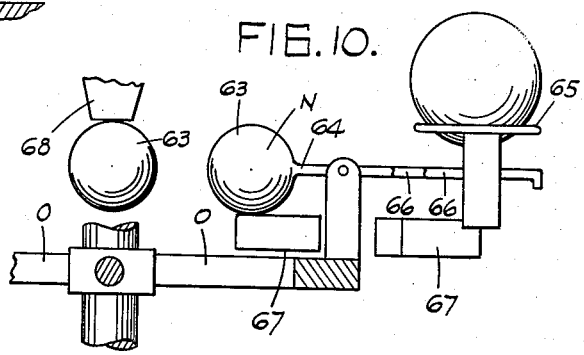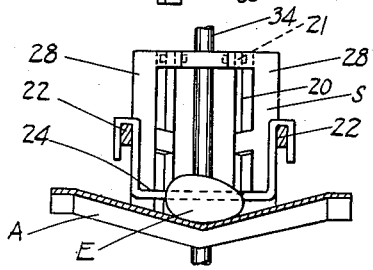

Patented Nov. 4, 1941

2,261,303

UNITED STATES PATENT OFFICE 2,261,303

EGG GRADING MACHINE

Stanley N. Smith, Hollis, N. H.

Application August 18, 1939, Serial No. 290,840

5 Claims. (Cl. 209—121)

This invention is an automatic machine for grading or sorting articles, especially eggs, according to weight. In the poultry business at the present time, eggs are classified and sold by their weight. In a quick action, automatic machine, on account of the fragility of egg shells, the eggs must be handled with great care and in the process of weighing, it is desirable that vibrating or shaking of the weighing device should be avoided as much as possible so that a definite weight can be ascertained in the shortest possible time.

I am aware that there are machines in which each egg is fed by hand to a particular place from which it is removed by something in the nature of a clam shell bucket and is deposited on a weighing device and if the egg is too light to trip that device, it is picked up and removed to another weighing device, etc. I am aware that there are other devices more or less automatic but I believe I am the first to devise a machine in which the eggs can be placed in a hopper or chute in such a way that they will roll or slide along it by gravity, or by being coaxed along manually, or by some other device, and will then be delivered one at a time to one of a series of moving weighing devices, a plurality of which are carried by an endless chain. This chain carries each weighing device past a series of trays into each one of which eggs of only a certain weight are delivered by the weighing devices, their weights being determined by the position of a slidable weight which is moved gently along a rod by one or more of a series of cams fixed to the frame as it moves between the trays.

As an egg when delivered to a weighing device stays with it as it travels in a straight horizontal path and as it is not disturbed, except by the gentle sliding of the weight toward the pivot, until the egg overbalances the weight and drops into its appropriate tray, great delicacy accompanied by great speed can be obtained. The construction avoids any shaking or swaying and there is no centrifugal force to consider and as a result, there is no delay in waiting for the parts to balance. The whole operation is steady and simple until the critical point when the egg is to be dumped and that is done quickly and at the appropriate place.

By avoiding a circular construction where centrifugal force might have an effect and by using an endless horizontal chain, I can in the same space and in the same area feed from each end of the chain and deliver on each side so that the capacity is doubled.

Of course I can feed at one end only and deliver at only one side or I might use feeding devices at one end only and receiving devices at one side only. I can also use a device such as a wheel which carries the weighing devices in a circular path.

In the drawings

Fig. 5 is a detail sectional side elevation showing part of the chute, gate and yoke.

Fig. 6 is a side elevation of a modification of the tripping guide disc and pin mechanism.

Fig. 7 is a vertical sectional end view enlarged as on the line 7—7 of Fig. 1.

Fig. 8 is a side elevation of a pivoted beam showing in dotted lines the position of the sliding weight as it starts and in full lines when delivering an egg.

Fig. 9 is a diagrammatic end elevation similar to Fig. 7 of a modified type of endless carrier.

Fig. 10 is a fragmentary view showing a modification of the type of balanced beam weighing device shown in Fig. 8.

Fig. 11 is an end elevation partly in section of the gate stopping the eggs as they roll or slide from a chute and releasing one at a time.

Figure 1:
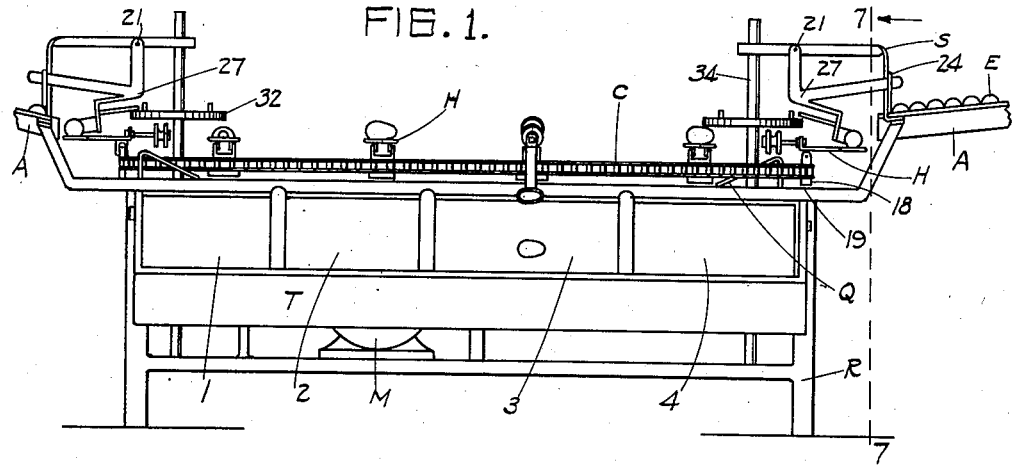
Fig. 1 is a side elevation of a double ended machine of my preferred construction some of the parts being omitted for clearness.
Figure 2:
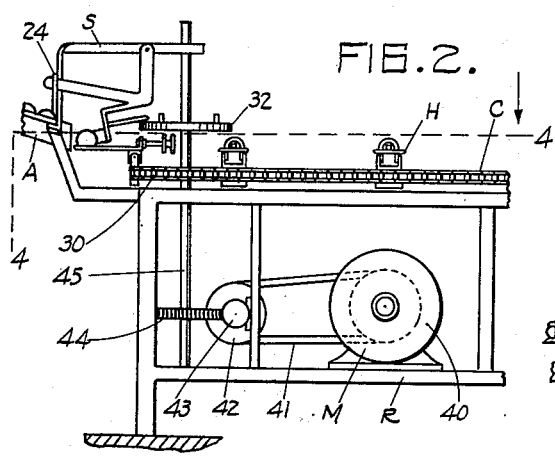
Fig. 2 is a side elevation of one end of the machine shown in Fig. 1 with the trays removed to show the driving mechanism.

In the drawings, R represents the frame of the machine and A represents a chute of the gravity type into which the eggs E can be fed by placing them by hand.

C represents an endless chain which travels in a horizontal plane around the sprockets 30 and 31, one of which is connected with the driving means M which, as shown, includes a motor 40 of the electric type, connected by belt 41 to a pulley 42 which drives a worm 43 which drives gear 44 carried by the shaft 45 which drives sprocket 30.

T represents trays 1, 2, 3 and 4 to receive eggs of different weights. These trays are suitably padded and are at such a slope that the eggs of a given weight when delivered by a weighing device, such as H, will roll quietly down without breaking.

S represents an intermittent egg delivery mechanism, the purpose of which is to open a gate 24 which holds back the eggs E and to allow a single egg to roll down the chute A onto the pan 14 of weighing device H and to stop the rest of the eggs until it allows another egg to be fed to the next pan when it comes around.

This delivery mechanism includes a rocker member 20 pivoted at 21 and carrying a yoke 22 on which gate 24 rests by gravity.

Yoke 22 is shown as fixed to member 20 and, as shown, all the mechanism S is supported by angular arms 28, 28 fixed to chute A and steadied by shaft 34.

Figure 3:
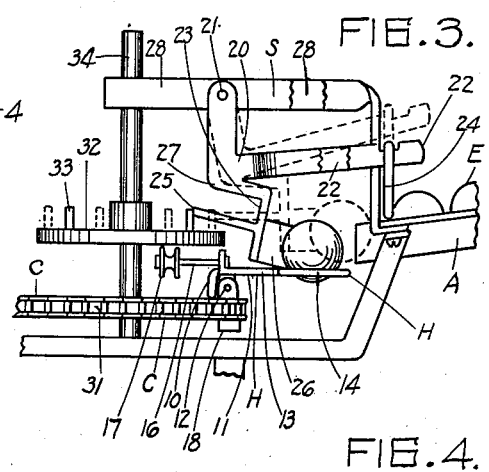
Fig. 3 is a detail side elevation showing one egg weighing device and parts of the egg feeding or egg delivery mechanism, the moving parts being shown in one position by full lines and in another position by dotted lines.

Arm 23 is fixed at 27 to rocker 20 and carries a flat plate 25 with a diagonal edge which engages from time to time one of the tripping pins 33 on a tripping guide disk 32 carried by the shaft 34 of and revoluble with sprocket 31. The action of a pin 33, as it comes around, on the plate 25 of an arm 23 is to lift rocker 20, carrying with it yoke 22 and gate 24, and to push the padded stop 26 up into the position dotted shown in Fig. 3. In that position, the gate 24 is lifted over the eggs but when a pin 33 has passed plate 25, the end egg which has been held in place by the padded stop 26, rolls into the pan 14 of the weighing device H which is ready for it at that time and gate 24 drops between the first and second egg.

This gate 24 holds back the next egg until the next pin 33 comes along and lifts the gate and pushes the padded stop 26 forward to receive the next egg from the gate, which is held above the third egg or between the next two succeeding eggs. As each pin 33 passes, the lowest or leading egg slips into a weighing pan 14 and the other eggs are held back by gate 24.

Each weighing device H includes a beam 11 which is carried on a pivot 12 by chain C and includes a rod 16 which projects inward and carries a sliding weight 17 and an outwardly projecting arm 13 which carries pan 14. This pan 14 is of a size to receive an egg as it passes the end of chute A and includes two carrying or egg receiving rods so curved that when an egg rolls, slips or drops onto them, it must rest with its axis at right angles to beam 11. The center of gravity of each egg, no matter what its size or shape, is, therefore, always at the same distance from the pivot.

Preferably, there is under each weighing device H a block 18 which slides along a grooved track 19 to keep the parts steady and from swaying.

The characteristic feature of the device is the series of cams which, by moving weight 17 on rod 16, determine what weight of an egg will overbalance the weight 17. These are shown as 91, 92, 93, 94, each one being so arranged that as the weight 17 passes, it slides along a cam from the outside towards the inside on its rod, the result of this being that if there is a light egg, it is overbalanced by the weight 17 until the weight has been moved nearer the pivot, upon which the egg will overbalance it and will fall into the appropriate tray. The heaviest egg will overbalance the weight when the weight is on the outside and intermediate eggs will overbalance at the right tray as they go along.

The last cam 94 is so set that it will tip up rod 16 and pan 14 down enough to surely empty its contents.

As all of the weighing devices are overbalanced, at least in theory, the pans 14 would all be down and to replace them in the proper position, I show a means Q to return each tipped arm to its horizontal position.

This resetting means Q, as shown, is a wire or rod which is fixed to frame R and which extends up at a slope in such a position that the arm 13 with pan 14 of beam 11 will strike the slope and be lifted to the horizontal position or slightly above it. If the rod 16 then slopes from pivot 12 slightly downward, weight 17 will slide inward towards its end into the proper position.

To keep the parts more positively controlled, however, stop 10 is provided to limit the motion of beam 11 in one direction while block 18 on chain C limits it in the other direction. Any other system of stops can be used, however.

To make sure that the weight 17 is out at the end of rod 16, I prefer to use an additional cam 51 carried by a fixed bow-shaped member 50, the cam being in such a position and of such shape that it will be struck by weight 17 and, as the chain moves, weight 17 will slide to the end of rod 16, at the same time moving under disk 32.

As weight 17 now moves closely under disk 32, the disk checks any tendency to flutter or chatter, and as the weighing pan 14 receives an egg from chute A or from the hand of an operator, it prevents the weight of the egg or the impact of the egg on the pan from causing the egg to be dropped until the weighing device is carried around to the first cam and the first tray.

I prefer to make the weight 17 of hour-glass shape because that allows it to roll under the disk 32, if necessary, and permits of weight of larger size which is light and because it allows a greater contact surface with each cam, thus providing for wear.

The disk 32 revolves with and may be considered as part of sprocket 31 and its shaft 34. It not only carries the tripping pins 33 but, as stated, keeps each weighing device H in the proper position and at the proper angle while it is being loaded.

However, as far as the pins are concerned, it might be a skeleton construction 60, with pins 62, as shown in Fig. 6 with a fixed guide 61 to hold the beam of each weighing device H in place while it is rounding the turn over the sprocket and while it is being loaded.

Figure 4:
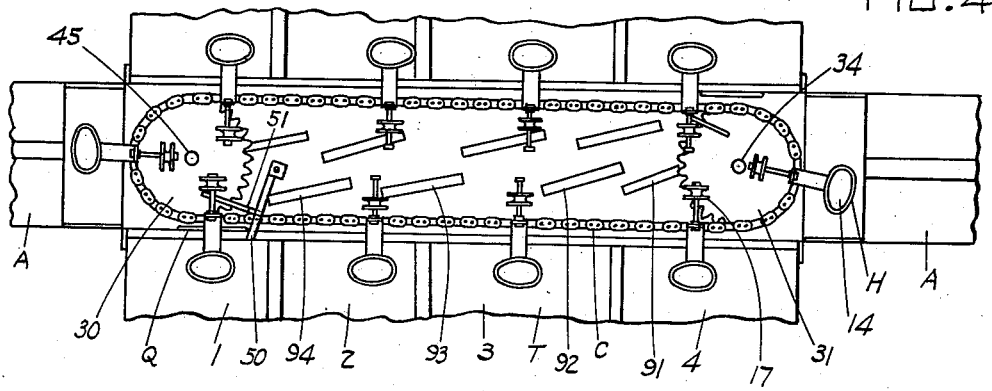
Fig. 4 is a plan view on the line 4—4 of Fig. 2 with parts removed for clearness.
Figure 4A:
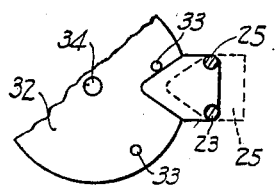
Fig. 4A is a top detail view of a tripping guide disc and plate, the plate being shown by full lines in one position and by dotted lines in another position.

While I prefer to use a construction in which the egg receiving pan does not slide but a weight is moved along a rod and where the weighing devices move in an ellipse with straight sides, with an automatic feed at each end and receiving trays at each side, as shown in Figs. 1, 4 and 7, the chute A might be omitted and the weighing devices N, N might be carried by a wheel O in a circular path as shown in Fig. 10. Each weighing device N might have a fixed weight 63 at one end of its beam 64 and a pan 65 slidable along two outside arms 66, 66, by means of cams 67, 67. In this construction, the eggs, or other similar articles, can be fed by hand by being placed individually in each pan 65 as it comes around, the pan preferably being steadied as by a fixed guide 68 over the weight to take up the shock of feeding, if there is any shock.

In Fig. 9 is shown an end view of a carrier which consists of sprockets such as 79 turning on horizontal pivots and carrying a chain U. This chain carries a plurality of weighing devices V, V each supported by a pivot 80 and consisting of a beam, one arm 81 of which carries a slidable weight 83 and the other arm 82 of which carries a pan 86 for an article such as Z.

Cams such as 84 shift weight 83 so that pan 86 may drop with article Z according to the distance of weight 83 from pivot 80. 85 represents a re-setting cam to push each weight 83 out to the end on the return trip. While this device has two sprockets and the chain has parallel sides, as shown, it can be fed at only one end and can deliver at only one side. A steadying member 87 holds pan 86 steady while being loaded.

In the preferred type of machine for use with eggs, however, the chute should be so made that the eggs will roll with their axes at right angles to the direction of motion and the gravity hung gate 24 is very necessary. While a fixed gate might serve with articles of substantially the same size and shape, with articles like eggs of different sizes, this gate will drop and rest on the back slope of a large egg, such as 70, or of a small egg, such as 71, as shown in Fig. 5, and when that egg moves forward, when the stop is moved away, the gate drops into position, as shown by the dotted lines, holding back the rest of the eggs and being ready for the next lifting.

This intermittent feeding device being pivoted at 21 to a fixed part of the frame and carrying the yoke 22 with gate 24, the stop 26, and the angular plate and arm 25 which is in the path of a pin such as 33, on a disc 32, which is synchronized with each weighing device, will move according to the shape of the part of 25 which comes in the path of the pin 33.

The articles to be weighed and sorted can be fed by hand or by intermittent delivery mechanism.

It is important, however, no matter how the eggs are fed to the pans, that their axes should be parallel with the pivot on which the weighing device moves. If one egg is fed with its small end inward and another with its small end outward, the weighing would not be accurate as the position of the center of gravity of the egg would determine the weight with reference to the pivot. In weighing symmetrical articles, such as oranges, this would not be as necessary and they could be dropped into a hopper and allowed to roll down a chute to land in any kind of a pan.

I claim:

1. In an automatic machine for sorting eggs by weight, the combination of a frame; with a gravity chute; an intermittent egg delivery mechanism including a lifting yoke having arms which carry a light stop gate hung on said arms and an angular plate and arm to raise and lower the yoke, together with a stop co-operating with the gate; chain sprockets, one of which carries pin means to engage the angular plate arm and to operate said gate and stop; an endless horizontal chain carried by said sprockets; a plurality of balanced egg weighing devices each carried by a horizontal pivot on the chain, each having at the end of its outer arm an egg receiving pan of substantially oval shape with its longer axis parallel with the pivot to receive an egg from the chute and on its inner arm having a slidable weight; a plurality of cams in position to move the weight on each arm to a different distance from its pivot as the weight passes; means to return each weighing device to its horizontal position after it has tilted to discharge its egg; egg receiving trays; and driving means for the sprockets.

2. In an automatic machine for sorting eggs by weight, the combination of a frame; with an intermittent egg delivery mechanism pivoted on the frame and including a gravity chute, a lifting yoke having arms which carry a light stop gate so hung on said arms proximate the chute that it can be lifted therefrom and an angular plate and arm to raise and lower the yoke, together with a stop co-operating with the gate; endless means to carry a plurality of egg weighing devices past the end of the chute; said egg weighing devices, each having a balanced beam with a sliding weight at one end and an egg receiving pan of substantially oval shape with its longer axis parallel with the pivot, at right angles to the chute when under its delivery end; and means operated by the weighing device carrier means to operate the egg delivery mechanism.

3. In an automatic machine for sorting eggs by weight, the combination of a frame; with an intermittent egg delivery mechanism, including a gravity chute, a lifting yoke having arms which carry a light stop gate hung on said arms and an angular plate and arm to raise and lower the yoke, together with a stop co-operating with the gate; chain sprockets, one of which carries on its shaft a guide disk from which project pin means to engage the angular arm and to operate the gate and stop; an endless horizontal chain carried by said sprockets; a plurality of egg weighing devices carried by the chain, each including a balanced beam having at the end of its outer arm an egg receiving pan to receive an egg from the chute and on its inner arm having a slidable weight; a plurality of cams in position to move the weight on each arm to a different distance from its pivot as the weight passes; means to return each weighing device to its horizontal position and each weight to its original position, whereby it can pass under the pin plate; egg receiving trays; and driving means for the sprockets.

4. In an automatic machine for sorting eggs by weight, the combination of a frame; with an endless horizontal chain carried by sprockets, said chain carrying a plurality of balanced egg weighing devices, each having at the end of its outer arm an egg receiving pan with its major axis at right angles to a radius of a sprocket and having a slidable weight on its other end; a guide disk revoluble with and other one sprocket and including pins so spaced as to synchronize with the egg weighing devices; a gravity chute; and an intermittent egg delivery mechanism pivoted to the frame over the chute and including a lifting yoke having arms which carry a light stop gate so hung on said arms that it can lift therefrom, a stop cooperating with the gate and the lower end of the yoke and an angular plate in position to be engaged by one of the pins so as to move the stop and yoke together.

5. In an automatic machine for sorting eggs by weight, the combination of a frame; with a plurality of spaced egg weighing devices each including a pan and pin means associated with each egg weighing device together with means to move the egg weighing devices so that each pan will approach a chute; said chute; and intermittent egg delivery mechanism including a lifting yoke having arms which carry a light stop gate so hung on said arms that it can lift therefrom, a stop cooperating with the gate, and an angular plate in position to be engaged by each pin so as to move the stop and yoke together to deliver one egg at a time.

STANLEY N. SMITH.